Oct. 22, 1968  H. RÖHL  3,407,036
PROCESS FOR THE PRODUCTION OF HYDROXYLAMINE SULFATE
SOLUTIONS BY CATALYTIC HYDROLYSIS OF HYDROXYLAMINE
MONOSULFONATE SOLUTIONS
Filed Jan. 25, 1965
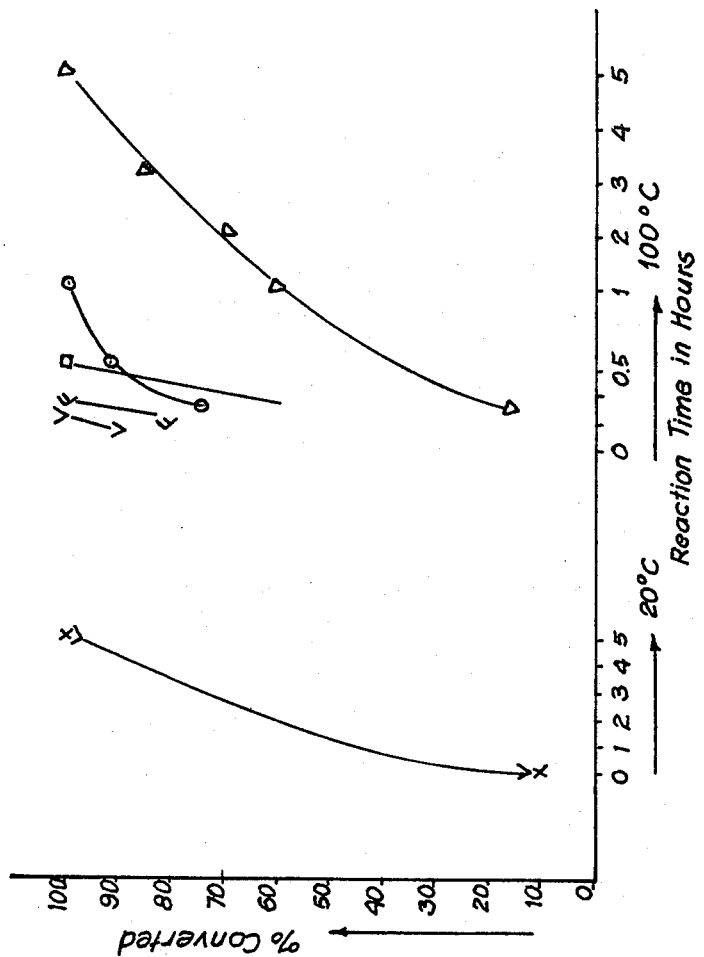
INVENTOR
HERMANN ROHL
BY Toulmin & Toulmin
ATTORNEYS United States Patent Office 3,407,036
Patented Oct. 22, 1968

3,407,036
PROCESS FOR THE PRODUCTION OF HYDROXYL-
AMINE SULFATE SOLUTIONS BY CATALYTIC
HYDROLYSIS OF HYDROXYLAMINE MONOSUL-
FONATE SOLUTIONS
Hermann Röhl, Marl, Germany, assignor to Chemische
Werke Huls Aktiengesellschaft, Marl, Germany
Filed Jan. 25, 1965, Ser. No. 427,633
Claims priority, application Germany, Jan. 30, 1964,
C 32,006
9 Claims. (Cl. 23—117)

ABSTRACT OF THE DISCLOSURE

The production of hydroxylamine sulfate, conventionally used as a photographic developer, reducing agent, etc., by hydrolyzing the hydroxylamine monosulfonate in the presence of about 0.01–2% by weight, based on the weight of said hydroxylamine monosulfonate, of a water-miscible aliphatic carbonyl compound such as an aldehyde or ketone.

The present invention relates to the production of hydroxylamine sulfate solutions. More particularly, it relates to the production of hydroxylamine sulfate solutions by the catalytic hydrolysis of hydroxylamine monosulfonate solutions in the presence of aliphatic carbonyl compounds.

Hydroxylamine sulfate is used in large amounts in industry for various purposes such as dehairing agent, photographic developer, purification of aldehydes and ketones, as a reducing agent, for the preparation of oximes from cycloaliphatic ketones, etc. For some purposes such as the production of oximes from the low molecular weight cycloaliphatic ketones, the monosulfonate solutions are suitable, but when cycloaliphatic ketones containing nine or more carbon atoms are used they can no longer be satisfactorily oximized with the monosulfonates and hence the latter must first be converted to hydroxylamine sulfate which effectively produces the oxime. During the production of hydroxylamine sulfate solutions by the Raschig process, in which a mixture of alkali- or alkaline-earth nitrite, hydroxide, carbonate and/or sulfite is reacted with sulfur dioxide, hydroxylamine disulfonate is formed, which during subsequent hydrolysis is converted to hydroxylamine monosulfonate. However, the further hydrolysis of the hydroxylamine monosulfonate to hydroxylamine sulfate takes place only at a very slow rate, several hours time being required for complete hydrolysis even at elevated temperatures.

German Patent No. 814,144 (page 3, lines 93–102) discloses the hydrolysis of hydroxylamine disulfonate to hydroxylamine monosulfonate but further hydrolysis to hydroxylamine sulfate does not take place under the conditions of temperature and time set forth therein.

German Patent No. 1,041,929 discloses a process for the partial hydrolysis of hydroxylamine disulfonate in which the latter is first partially hydrolyzed by the aid of added warm hydroxylamine sulfate solution, and the resulting hydroxylamine monosulfonate further hydrolyzed at a higher temperature. This process, however, also requires a period of several hours time for the complete hydrolysis of the hydroxylamine monosulfonate.

According to the process of the present invention, hydroxylamine sulfate solutions can be quickly and simply produced with good yields by catalytic hydrolysis of hydroxylamine monosulfonate solutions by carrying out the hydrolysis in the presence of catalysts comprising water-soluble aliphatic carbonyl compounds present in an amount of 0.01–2% by weight based on the weight of the hydroxylamine sulfonate.

The attached drawing is a graphical representation of the effect on reaction rate of the catalysts of this invention at 20° and 100° C., as compared to the absence of catalysts.

The aliphatic carbonyl compounds suitable for use as catalysts include the low molecular weight aliphatic aldehydes containing up to 6 carbon atoms, i.e., formaldehyde, acetaldehyde, propionaldehyde, butyraldehyde, valeraldehyde, and capronaldehyde. Because of their better solubility, better results are obtained with formaldehyde and acetaldehyde, from 0.1 to 1%, and preferably from 0.03 to 0.06% by weight of the aldehyde (based on the weight of the monosulfonate) being usually adequate to catalyze the reaction and effect rapid and substantially complete hydrolysis of the hydroxylamine monosulfonate to hydroxylamine sulfate. The remaining aldehydes specified being less soluble are somewhat less effective and requires larger amounts of the catalyst because of the reduced water-solubility thereof.

The low molecular weight water-soluble aliphatic ketones are similarly effective in carrying out the desired reaction. Because of their better water solubility, acetone and methyl ethyl ketone are the more effective and generally are used in amounts ranging from 0.1 to 2.0% and preferably, from 0.05 to 1% by weight (based on the weight of the hydroxylamine monosulfonate). The higher molecular weight, less water-soluble aliphatic ketones are usually somewhat less effective and require the use of larger amounts of catalyst because of the reduced solubility thereof.

For most desirable results the carbonyl compound selected for use as the catalyst should preferably be readily miscible in the hydroxylamine monosulfonate solutions, and use is preferably made of carbonyl compounds which are completely water-soluble or water-miscible.

The temperature at which the hydrolysis is effected is not particularly critical and hydrolysis may be saticfactorily effected at temperatures ranging from room temperature (20° C.) to 110° C., and preferably between 40° and 100° C. When the carbonyl compound used is an aldehyde such as formaldehyde or acetaldehyde, rapid hydrolysis takes place even at room temperature.

The hydroxylamine monosulfonate used in the process of the present invention may be prepared by any of the suitable prior art methods, as for example, that disclosed in German Patent No. 967,551. The aqueous solutions used in the process generally contain from 50 to 200 g., and preferably from 120 to 170 g. of hydroxylamine monosulfonate per liter.

The aliphatic carbonyl compounds used as catalysts can be added continuously to the aqueous hydroxylamine monosulfonate solution flowing from the reaction vessel as produced, and the resulting solution hydrolyzed at the desired temperatures. The progress of the hydrolysis is preferably followed by means of any suitable means, as for example, with a potentiometric measuring device.

In the appended drawing where percent conversion is plotted against reaction time, at 20° C. and 100° C., the conversion hydroxylamine monosulfonate solutions (160 g./l.) are carried to completion (100%). The curves (–x–x) and (–v–v) shown on the lefthand side of the graph illustrate a process conducted in the presence of 0.4% by weight of formaldehyde or acetaldehyde at 20° C., as shown in Table I. The curves (–Δ–Δ) on the righthand side of the drawing show the result when the process is conducted at 100° C. in the absence of aldehydes or ketones, and the remaining curves in the presence of the aldehydes or ketones, as listed in Table II.

TABLE I
[Reaction Temperature, 20° C.]

| Carbonyl Compound Used | Carbonyl Compound Used in Percent by Wt. | Time Required for Complete Hydrolysis |
| --- | --- | --- |
| None | | 30 days |
| Formaldehyde (-v-v-)* | 0.4 | 300 minutes |
| Acetaldehyde (-x-x-) | 0.4 | 300 minutes |
| Acetone | 0.5 | 600 minutes |
| Methyl ethyl ketone | 0.6 | 600 minutes |

*See graph.

TABLE II
[Reaction Temperature, 100° C.]

| Carbonyl Compound Used | Carbonyl Compound Used in Percent by Wt. | Time Required for Complete Hydrolysis |
| --- | --- | --- |
| None (-Δ-Δ-)* | | 300 minutes |
| Formaldehyde (-v-v-) | 0.1 | 10 minutes |
| Acetaldehyde (-f-f-) | 0.1 | 15 minutes |
| Acetone (-⊙-⊙-) | 0.5 | 60 minutes |
| Methyl ethyl ketone (-□-□-) | 0.5 | 30 minutes |

*See graph.

The results given in the above tables clearly show the striking improvement obtained by catalyzing the hydrolysis of hydroxylamine monosulfonate to hydroxylamine sulfate using aliphatic carbonyl compounds.

The examples cited above have been given for purposes of illustration only and it is specifically understood that various modifications of the specific procedure described will be obvious to one skilled in the art, and that other carbonyl compounds not specifically disclosed will also be operative. Such variations which do not depart from the concept of the invention are intended to be covered by the appended claims.

What is claimed is:

1. Process for the production of hydroxylamine sulfate which comprises hydrolyzing hydroxylamine monosulfonate in the presence of about 0.01–2% by weight, based on on the weight of said hydroxylamine monosulfonate, of a member selected from the group consisting of a water-soluble aliphatic aldehyde and a water-soluble aliphatic ketone.

2. A process as defined by claim 1 wherein said member is a water-soluble aliphatic aldehyde of 1–6 carbon atoms.

3. A process as defined by claim 1 wherein said member is a low molecular weight water-soluble aliphatic ketone.

4. A process as defined by claim 1 wherein the hydrolysis is conducted at 20–110° C.

5. A process as defined by claim 2 wherein the aldehyde is present in a concentration of 0.01–1% by weight based on the weight of said hydroxylamine monosulfonate.

6. A process as defined by claim 1 wherein said member is formaldehyde.

7. A process as defined by claim 1 wherein said member is acetaldehyde.

8. A process as defined by claim 1 wherein said member is acetone.

9. A process as defined by claim 1 wherein said member is methyl ethyl ketone.

References Cited

UNITED STATES PATENTS 3,105,741   10/1963   Moore et al. _____ 23—117 X

OSCAR R. VERTIZ, *Primary Examiner.*

E. C. THOMAS, *Assistant Examiner.*